R. LOVSTROM.
LIGHT PROJECTION DISPLAY.
APPLICATION FILED MAR. 19, 1920.

1,406,663.

Patented Feb. 14, 1922.

INVENTOR,
Richard Lovstrom,
BY
Rogers, Kennedy & Campbell,
ATTORNEYS

R. LOVSTROM.
LIGHT PROJECTION DISPLAY.
APPLICATION FILED MAR. 19, 1920.

1,406,663.

Patented Feb. 14, 1922.

INVENTOR,
Richard Lovstrom,
BY Rogers, Kennedy & Campbell,
ATTORNEYS.

UNITED STATES PATENT OFFICE.

RICHARD LOVSTROM, OF NEW YORK, N. Y.

LIGHT-PROJECTION DISPLAY.

1,406,663.                    Specification of Letters Patent.    Patented Feb. 14, 1922.

Application filed March 19, 1920. Serial No. 367,147.

*To all whom it may concern:*

Be it known that I, RICHARD LOVSTROM, a subject of the King of Denmark, residing at New York, in the county of New York and State of New York, have invented certain new and useful Improvements in Light-Projection Display, of which the following is a specification, reference being had therein to the accompanying drawing.

This invention relates to the art of light projection display, for example, the projection of effects in light or color on a curtain for exhibition. Not only a novel art, system or method is involved, but a novel apparatus or machine. The purpose of the invention may be for entertainment or for interpretive purposes, and certain practical utility is possible in connection with psychical study, or even mental or eye treatment.

The main object of the invention is to enable the projection upon a suitable curtain or background of pleasing or stirring effects in lights and shadows or colors, the production of endless variations in tone and pattern or design, yielding harmonies or contrasts of various sorts, enhanced by progressive change or motion of pattern, shape, color or shadow in various modes of motion, curious, startling or otherwise entertaining, all under the control either of chance or of the intention and purpose of the expert or artist, who by creative skill may develop effects of desired nature in sequence involving a rhythm of light, shadow, color and form, comparable in enjoyment by a spectator or audience to a composition of music, which indeed may accompany or be interpreted by the light or color composition when handled by an artist skilled in both subjects. A further object is to afford a relatively simple apparatus or machine adapted to carry out effects of the nature set forth or other optical effects, and which apparatus is readily controllable or actuable by the operator thereof. A further object is to supplement the essential elements of the invention by additional combinable features or elements for the purpose of lending greater scope and variety to the producible effects. Other and further objects and advantages of the present invention will be made clear during the hereinafter following description, or will be apparent to those conversant with the subject.

To the attainment of the objects and advantages referred to, the present invention consists in the novel art, system or method and the novel apparatus or machine herein described or illustrated, as well as the novel features of combination, arrangement, operation, construction and detail.

I will first enumerate certain of the main elements involved in the present invention before giving a detail description of the drawings and mechanism. A suitable stand, frame or box is presupposed, as well as a receiving curtain, wall or other surface, on which the effects are to be projected. The latter may be of large size suitable for the entertainment of entire audiences. In some cases the effects could be entertainingly projected upon a surface of a body of floating vapor. A lamp is an essential element, by which I have reference to any suitable source of high illumination, and as explained I prefer an electric lamp of the filament type, the filament of which may be of a three dimensional geometric figure, to the enhancement of the producible effects. A second essential element is a lens, by which I intend to include a glass or crystal structure, preferably of curved surface, regular or irregular, but which might be made up of surface facets. The lamp and lens are relatively arranged generally in a line, which may be termed the axis of the system, which, continued, extends toward the curtain. Relative movement between the lamp and lens is a feature of this invention. For example, the lamp is movable toward and from the lens, as well as in directions at angles to the main axis. The lens is preferably set at a slant to the main axis, rather than at right angles, and also is preferably adjustable to change the slant. The described lens movements and relative movements of the lamp and lens may be performed during the operation of the invention, so as to give the various movements of pattern, shape, light, color and shadow, as will be described. The element of color I preferably introduce by one or more shiftable transparent colored glasses or screens, which are shown as arranged forward of the lens, each having a distinctive color and being movable suddenly or gradually into or out of the field of projection. With these three main elements, the lamp, the lens and the color screens, and their fittings and actuation, endless effects and combinations of the nature referred to are producible; and with these as a basis certain supplemental or varying devices may be added to yet further multiply the possibilities of effect.

In the accompanying drawings Fig. 1 is what may be termed a righthand elevation of an apparatus illustrating the main elements involved in one form or embodiment of the invention, with certain parts broken away to more fully show the interior mechanism.

Figure 1:
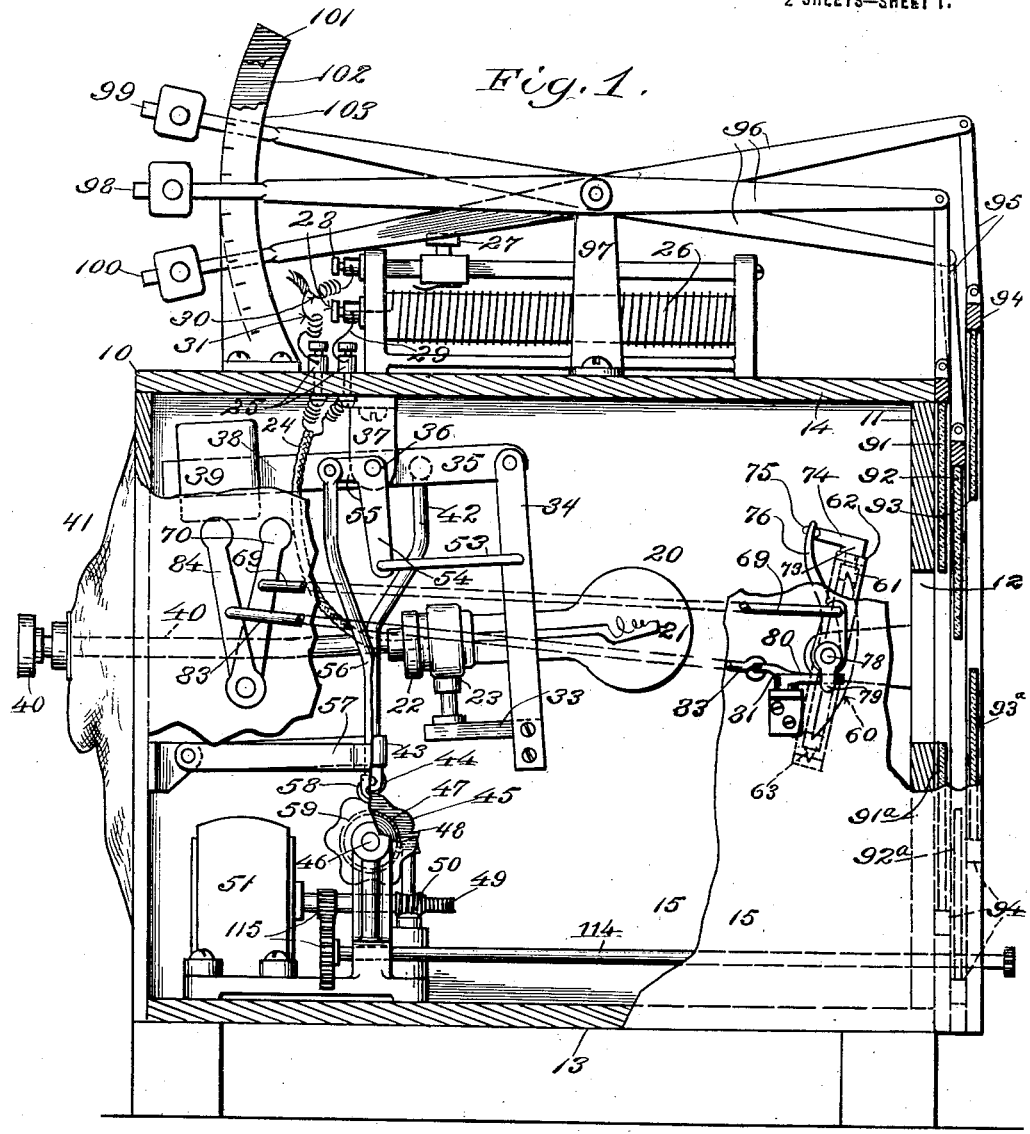
Figure 2:
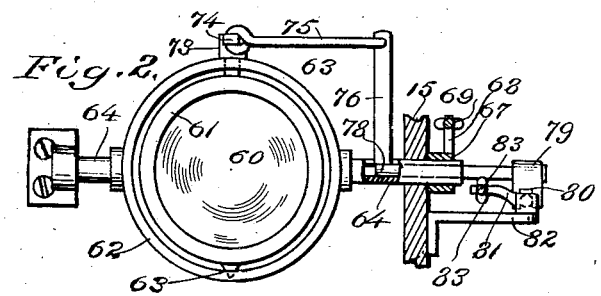
Fig. 2 is a rear elevation of certain details, namely, the lens fittings shown in Fig. 1.

The drawings, showing one possible instance or embodiment of the apparatus hereof, capable of practicing the system, art, or method hereof, and securing the results and effects referred to, may be specifically described in detail as follows. A box, casing, or frame 10 is shown, which is preferably stationary and is supposed to be directed toward a distant curtain, by which I include the wall or any surface which is white or of light color, adapted to receive the projected effects. Within or associated with the box 10 are the lamp 20, the lens 60, the color screen device, 90, and other operative elements involved in the present invention.

The box 10 is shown as formed with a rigid front wall 11, which is provided with an aperture 12 in front of the lamp position and in the general axial line with the lamp, lens, screens, and curtain. The box floor 13 and its top wall 14 supports certain interior elements, and the right and left sides are enclosed by side walls 15. For convenience of description, the end of the box nearest the curtain will be termed the front thereof, and the opposite end the rear. The operator may stand behind the rear of the box for controlling or operating the invention, and the terms righthand and lefthand will be taken from the point of view of such operator.

The lamp 20 is shown as an incandescent electric lamp of the filament type, although various other lamps might be employed. The filament 21 may have the specific shape shown or any other convenient shape, different filament forms giving different optical effects. The lamp hereof is shown movable, and not merely shiftable for purposes of adjustment but operatively movable during a performance. The lamp socket 22 is shown mounted on a holder or support 23. Two electrical conductors 24 extend flexibly from the socket to terminals 25 in one of the box walls. Adjacent thereto is shown a rheostat 26 having a control handle 27 and terminals 28. One of these terminals connects by conductor 29 with one of the terminals 25, and line wires 30 and 31 extend, respectively, to the other terminals 25 and 28.

The lamp 20 may be fitted for movement in various ways, for example, as follows. The support or holder 23 is mounted directly on a carriage or platform 33. It may be rotatably mounted therein as shown, so that the lamp can be swung about this pivot to different positions, thus permitting the lamp to be moved more or less to the right or left.

The carriage 33 is shown suspended by hanging rods 34 which at their upper ends are pivoted to horizontal beams 35 each having a central fulcrum 36 connecting it to a bracket 37 standing downwardly from the top wall 14. Rear extensions 38 of the beams 35 are provided with counterbalancing weights 39 calculated to offset the weight of the lamp and carriage so that the parts will always remain where set.

With these fittings the lamp movements might be performed wholly by hand. For this purpose I have indicated a light rod or handle 40 projecting rearwardly from the lamp socket to an exterior point where it may be manipulated upwardly, downwardly, right and left, forwardly or rearwardly, as desired. The lamp will remain where positioned when the rod is released. A black cloth 41 is shown as enclosing the rear side of the box, the rod 40 passing through it, and the flexibility of the cloth permitting the universal movements mentioned. The rod 40 may also be rotated to rotate the lamp, filament and project effect.

In order, however, to best secure the full possible effects of the present invention, the operator may be relieved of the hand movements of the lamp, which may be put slowly through certain predetermined movements automatically, leaving the operator free to manipulate the lens and the color screens. For this purpose, many forms of lamp actuating mechanism may be employed, for example, as follows.

Extending downwardly from one of the beams 35, in front of its pivot, is a connecting rod 42 passing through a fixed guide 43. Upward and downward movements of the rod will correspondingly lift and drop the lamp. At its lower extremity the rod is provided with a roller 44 bearing upon a cam 45 mounted on a shaft 46 carrying a worm wheel 47 driven by a worm 48, which in turn is mounted on the shaft of a second worm wheel 49 driven by a worm 50 on the shaft 52 of a small electric motor 51. The motor may be controlled as to speed by a rheostat. The cam 45 may be variously shaped to give different sorts of up and down motions to the lamp. The lamp may simultaneously have motions in other directions, for example, forward and rearward, the combinations of different motions affording endless possibilities of effects. To cause automatic forward and rearward movements, a link 53 is shown extending from one of the suspended rods 34 rearward to the arm 54 of a bell crank lever fulcrumed at 36, and whose other arm 55 extends rearward and is connected to downward rod or link 56 guided in a guide 57 and provided with a roller 58 resting upon a suitable cam 59 mounted on the cam shaft 46.

By these mechanisms the lamp will be given predetermined motions behind the lens, and the control cams 45 and 59 may be changed and interchanged to vary the effects indefinitely. The variations secured by the three possible lamp motions are still further enhanced by the operation of rendering the lamp brighter and dimmer through the rheostat 26.

The lens 60 is shown in an inclined position, and is also shown as shiftable. The lens may be of different types, such as double convex, or concavo convex, but the shown plano convex is preferred. When this is held in the position shown, remarkable optical effects are produced on the curtain and the effects are alterable by shifting the lens to a new position, the change of effect during the shifting giving in itself a variation of effect.

Preferably, the lens 60 is shiftable to various slanting positions about either or both of its vertical and horizontal axes. To this end it is universally mounted. The lens proper is secured in a metallic ring 61, which is surrounded by a second or gimbal ring 62. Upper and lower pivots 63 between the rings permit adjustment in one manner, and horizontal pivots 64 at the sides of the gimbal ring permit shifting in the other manner.

To tilt the lens about its horizontal axis, one of the pivot studs 64 is shown extended outwardly at 66 beyond one of the box sides 15, and its extremity is provided with a wheel or turning device 67; this could be turned by hand, but to render it more accessible I secure rigidly to it a rod or spoke 68 connected by a link 69 with an upright lever 70 near the front of the machine. This lever may be swung forwardly and rearwardly by hand having an index extension 70ª which moves along a graduated scale 71, permitting ready adjustment of the lens slant about its horizontal axis.

To similarly permit adjustment about a vertical axis, one of the pivot studs 63 is extended outwardly at 72 and provided with a turning device or wheel 73. This in turn is provided with a radial arm or spoke 74 connected by a link 75 with a rock lever 76 mounted on a bracket 77 outstanding from the gimbal ring 62. The lever 76 is pivoted to an interior rod 78 sliding inside the pivot shaft 64, the latter being slotted to permit the connection. At its outer extremity the rod 78 is formed with a head 79. If this is slid inwardly and outwardly, it acts through the connections 72 to 78 to swing the lens about a vertical axis. This motion may be effected by a bell crank lever, one arm 80 of which engages the head 79, and the other arm 81 of which, pivoted to a fixed bracket 82, is actuated through a connecting link 83 from a hand lever 84 near the rear of the machine, and having an index extension 84ˣ moving adjacent to a graduated scale 71 by which the operator can determine the lens position.

The lens 60 is preferably located within the box 10, between the front wall aperture 12 and the lamp 20. The color screen device is preferably located in front of the front wall 11, as shown. Instead of a single screen with a single color, I prefer a plurality of colors embodied in a plurality of independently shiftable screens. Thus, three screens 91, 92, and 93, are shown movable into and out of position in front of the aperture 12. The screen 91 may be taken as yellow, 92 as red, and 93 as blue. Each of these is shown movable downwardly and upwardly so that it may be positioned partly or wholly in front of the aperture or withdrawn therefrom. I prefer that each of these screens shall have an oppositely located screen of the same color, movable with it. Thus, spaced below the yellow screen 91 is a yellow screen 91ª, and similarly with the others. A single frame 94 carries both the yellow screens 91 and 91ª. The result is that the interception of the light by the colored glass may be effected either from above or from below, that is by dropping or by lifting the frame. Each of the three frames is shown suspended by a member 95 from an overhead swinging beam 96, the three beams being mounted on a suitable bracket 97 upon the top wall of the box. This forms a simple, effective and convenient mode of effecting the screen movements. The three swinging beams 96 are provided, respectively, with counterbalance weights 98, 99, and 100, at their forward ends corresponding to the yellow, the red, and the blue screens, respectively. These weights may serve both to offset the weights of the screens, so that the parts will stay where adjusted, and also as handles, easily accessible to the operator, for effecting the adjustments. Alongside of the three handles are three graduated scales 101, 102, and 103, by which the operator can readily see the position of each screen, whether it is centrally positioned, or raised or depressed therefrom.

With such an arrangement, various combinations of the three selected colors, and of weights, are possible. Thus, as the parts are shown adjusted, the red screen has been depressed somewhat, and the blue screen raised, but neither of them quite to the center line, so that, in the projected effect, a white belt or streak will appear separating the blue and the red portions of the design. In some cases the colored glasses could be overlapped to give further variations of the result. It seems unnecessary to elaborate all possible manipulations and variations which may be effected by the described color screens in combination with the lamp and the lens, and the various motions which may be imparted to them, respectively.

Figure 3:
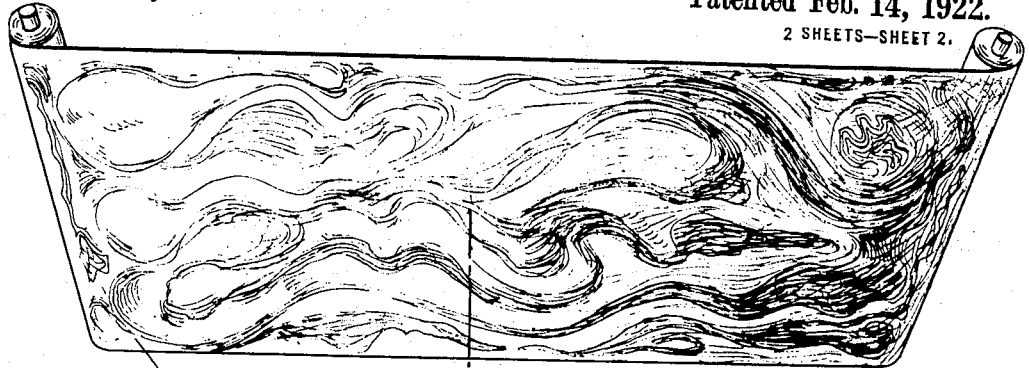
Fig. 3 is a perspective view on a small scale showing the relation of the apparatus of Figs. 1 and 2 to the receiving curtain, although the intervening distance is shortened for concentration, this figure also showing additional combining elements or adjuncts of value in the operation of the present invention.
Figure 3:
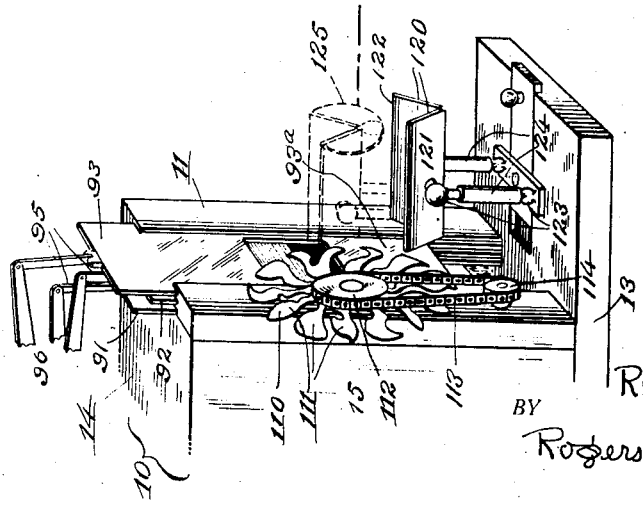

In Fig. 3 in front of the lens, and in fact in front of the color screen devices 90, are shown certain supplemental elements or instruments adapted to combine with those described for the purpose of lending greater scope and variety to the producible effects, when desired.

The first of these is a shadow making device 110, which may be a disk partly open or transparent and partly opaque or colored. The obstructing portions of this device as they pass in front of the lens, in the path of the light, throw dark or colored shadows, which according to the speed of the device will travel more or less rapidly and irregularly across the curtain. This device may take various physical forms. It may be detached. It may be used in pairs or greater numbers. It is shown as comprising a plurality of fingers or outlines 111, all mounted rotatively on a common hub 112, which may be slowly rotated from the motor 51 by means of the illustrated mechanical connections 113, 114 and 115 or their equivalents.

In front of all the described elements is a reflecting or mirror element 120. Any number of mirrors may be employed and arranged in various relations, but I have shown two mirrors 121 and 122 set at an angle of about 60° as in a kaleidoscope, each, however, being adjustable by means of a joint 123 at the top to its stand 124. By arranging the mirrors as shown with their longitudinal edges meeting at approximately the center of the line of projection, the pattern or effect comprised in the 60° sector between the mirrors will by the reflections thereof be multiplied around the circle so as to give more or less symmetrical results in design, color and motion in the corresponding sectors of the exhibiting curtain.

For the purpose of further modifying the effect I have shown a bank of footlights 130, which may be of some bright color, these operated electrically by conductors 131, and having behind them a reflector 132 for diffusing the light over the curtain or a portion of it, so as to throw the additional light and color upon the effects produced by the main portion of my apparatus. A similar bank of overhead lamps 135 may be directed analogously toward the curtain by a reflector 136.

The curtain 140, may be rolled progressively from one roller to another during performance, with changing character or color; as indicated, and it may be supplemented by surfaces in front of it, for example, of gauze, to give effects of depth and the like.

The lamp 20 might be replaced with a series or succession of lamps, one passing into action before another passes out, and each lamp may be given an individual motion or rotation.

The various described elements give a universal flexible operation and apparatus. The several elements or instruments are provided with various motions or actions. Some of these motions or actions are shown as automatic, being controlled by cams, and this principle might be extended to more or to all of the operations of the several elements; but by preference certain of the actions are left to the skill and judgment of the operator, and, as already stated, every one of the actions might be left to artistic skill and taste rather than to the predetermined result of a cam or other mechanism.

The lamp has its six described motions of displacement, as well as rotation in either direction, and control to render it brighter or dimmer. The lens, which is shown slanting, is universally adjustable to any slant. Either the lamp or the lens or both of them may be maintained in motion during the exhibition. A moving image of the luminous filament is thus thrown on the curtain. The image will vary both in size and definition in accordance with the relation of the filament to the focal plane of the lens, which plane itself may be under a constant shifting action. As the incandescent filament passes slowly through the focal plane, it throws what may be described as a changing cross-section, the parts of the filament at the plane being shown sharply on the curtain, but changing progressively during the movements of the filament, and the balance of the filament, also in motion, being more or less blurred or diffused, giving projected areas which merge into each other and into the clearly focussed portion, subsequently to again emerge or evolve into a curious and interesting progression. These facts take place to some extent when the lens is set normally to the axis, but the slanting of the lens contorts the image, expanding or contracting it at different sides, and thus adding a weird beauty to the theme of light and shadow. Motions of flowing will occur, and also gyrating, as well as enlarging and shortening, and overlapping, brightening and fading, in various shapes or patterns involving lines or stripes, islands, borders or blotches, regular or irregular.

The influence of the combined color screen device upon these effects is striking and unexpected. Besides the whites, grays and blacks, will appear in various designs, areas of color or colors, tints or shades, affording harmonies and contracts of tone, and changing not merely with the motions of the projected light, but with the separate motions of the different color screens themselves, by which the selected colors can be wrought and woven in by the operator in various striking ways, so as to give effects of endless variety and character, simple or complicated, mysterious or majestic.

The added effects combinable with those described by the operation of the shadow making device and by the reflectors and by the stationary forward lights have been sufficiently set forth.

It will thus be seen that I have described a novel art, system or method of light projection display, as well as a novel apparatus or machine for carrying out such art, embodying the principles and attaining the purpose of the present invention. Since many matters of operation, arrangement, construction, combination and detail may be variously modified without departing from the underlying principles, it is not intended to limit the invention to such matters except in so far as specified in the appended claims.

What is claimed is:

1. Light projection apparatus for displaying upon a curtain progressive effects of pattern and motion, the same comprising an incandescent filament, a lens between the filament and curtain, a holder for supporting the said filament, fittings for said holder permitting it to move toward and from the lens, and also laterally, during projection, mechanical connections for methodically moving said holder and filament toward and from the lens during projection, and other mechanical connections for methodically moving said holder and filament laterally during projection.

2. Light projection apparatus for displaying upon a curtain progressive effects of pattern and motion, the same comprising an incandescent filament, a lens between the filament and curtain, a rotary holder for supporting the said filament, fittings permitting relative bodily movement between the lens and holder during projection, mechanical connections for methodically effecting such relative bodily movement during projection, and other mechanical connections for methodically rotating said holder and filament during projection.

3. Light projection apparatus for displaying upon a curtain progressive effects of pattern and motion, the same comprising an incandescent filament of three-dimensional contour, a lens between the filament and curtain, a rotary holder for supporting the said filament, fittings for said holder permitting it to move bodily toward and from the lens, and also laterally, during projection, mechanical connections for moving said holder and filament toward and from the lens during projection, other mechanical connections for moving said holder and filament laterally during projection, and other mechanical connections for rotating said holder and filament during projection.

4. Light projection apparatus for displaying upon a curtain progressive effects of pattern and motion, the same comprising an incandescent filament, a lens between the filament and curtain, a universally mounted carriage for supporting the said filament, mechanical connections for methodically moving said carriage and filament toward and from the lens during projection, and other mechanical connections for methodically moving said carriage and filament laterally during projection.

5. Light projection apparatus for displaying upon a curtain progressive effects of pattern and motion, the same comprising an incandescent filament, a lens between the filament and curtain, arranged at an unsymmetrical slant to distort the projected moving image, a holder for supporting the said filament, fittings permitting relative movement between the lens and holder during projection, and mechanical connections for methodically effecting such relative movement during projection.

6. Apparatus as in claim 5 and wherein are means for effecting, during projection, a tilting of the lens to varying unsymmetrical slants.

7. Apparatus as in claim 1 and wherein is a single actuator controlling both said connections for synchronizing said movements of the filament.

8. Apparatus as in claim 4 and wherein is a single actuator controlling both said connections for synchronizing said movements of the filament.

9. Apparatus as in claim 1 and wherein are a plurality of color screens and means for selectively interposing them in the light path during projection.

10. Apparatus as in claim 2 and wherein are a plurality of color screens and means for selectively interposing them in the light path during projection.

11. Apparatus as in claim 6 and wherein are a plurality of color screens and means for selectively interposing them in the light path during projection.

12. Light projection apparatus for displaying upon a curtain progressive effects of pattern and color, the same comprising an incandescent filament, a lens between the filament and curtain, a holder for supporting the filament, fittings permitting relative bodily movement between the lens and holder during projection, and a color screen device comprising transparent screens movable in the light path during projection.

13. Apparatus as in claim 12 and wherein the color screen device comprises transparent screens of different colors movable selectively into the light path during projection.

14. Light projection display apparatus comprising a filamentary light source, a lens between the light and curtain, the two fitted for relative movement during projection, and a color screen device located adjacent the lens, consisting of transparent screens of different colors movable selectively from different sides into and from the light path during projection.

15. Apparatus as in claim 14, and wherein the color screen device comprises two screens of each color, the two oppositely arranged and each adapted to be partially or wholly interposed in or removed from the light path during projection.

16. Apparatus as in claim 15 and wherein control mechanism for the several screens is provided, permitting independent shifting of the several screens at will, whereby any color can be interposed or withdrawn and displaced by a different color with or without an interval of white light between.

In testimony whereof, I have affixed my signature hereto.

RICHARD LOVSTROM.